US012628248B2

(12) United States Patent
Kim et al.

(10) Patent No.: US 12,628,248 B2
(45) Date of Patent: May 12, 2026

(54) COOKING APPARATUS

(71) Applicant: SAMSUNG ELECTRONICS CO., LTD., Suwon-si (KR)

(72) Inventors: Gyeongjin Kim, Suwon-si (KR); Eonjoong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1060 days.

(21) Appl. No.: 17/722,468

(22) Filed: Apr. 18, 2022

(65) Prior Publication Data

US 2022/0322502 A1 Oct. 6, 2022

Related U.S. Application Data

(63) Continuation of application No. PCT/KR2022/003632, filed on Mar. 15, 2022.

(30) Foreign Application Priority Data

Mar. 31, 2021 (KR) ........................ 10-2021-0042338
Jul. 8, 2021 (KR) ........................ 10-2021-0089562

(51) Int. Cl.
*H05B 6/64* (2006.01)
*H05B 6/72* (2006.01)

(52) U.S. Cl.
CPC ........... *H05B 6/6408* (2013.01); *H05B 6/725* (2013.01)

(58) Field of Classification Search
CPC .... H05B 6/6408; H05B 6/725; H05B 6/6402; H05B 6/6426; H05B 6/745; F24C 15/00
See application file for complete search history.

(56) References Cited

U.S. PATENT DOCUMENTS 4,563,559 A * 1/1986 Enami ..................... F24C 15/08 220/619
4,597,374 A * 7/1986 Igarashi .................. F24C 15/08 219/762
5,938,967 A 8/1999 Reo et al.
(Continued)

FOREIGN PATENT DOCUMENTS

CN 104832958 A * 8/2015 ............. H05B 6/745
CN 104832958 B 10/2019
(Continued)

OTHER PUBLICATIONS

International Search Report dated Jul. 8, 2022 in International Patent Application No. PCT/KR2022/003632 (3 pages; 4 pages English translation).

(Continued)

*Primary Examiner* — Tiffany T Tran
(74) *Attorney, Agent, or Firm* — STAAS & HALSEY LLP

(57) ABSTRACT

A cooking apparatus includes a cooking chamber, a heating source disposed below the cooking chamber to produce high-frequency waves, a main plate forming at least a portion of the cooking chamber and including a front side which is opened, a front plate coupled to the front side of the main plate and including a base having an opening connected to the cooking chamber, and a front coupling flange. The front coupling flange is bent rearward from an inner end of the base, coupled by curling with the main plate, and has a portion which protrudes above a lower surface of the main plate.

14 Claims, 15 Drawing Sheets

(56) References Cited

U.S. PATENT DOCUMENTS

| | | | | |
|---|---|---|---|---|
| 7,586,069 | B2 | 9/2009 | Inoue et al. | |
| 2019/0045590 | A1* | 2/2019 | Kunimoto ............... | F24C 7/046 |

FOREIGN PATENT DOCUMENTS

| | | | |
|---|---|---|---|
| JP | 10-132291 | | 5/1998 |
| JP | 2002-372247 | | 12/2002 |
| JP | 2004-108755 | | 4/2004 |
| JP | 4263002 | B2 | 5/2009 |
| JP | 2019-148405 | A | 9/2019 |
| KR | 20-1995-019962 | | 7/1995 |
| KR | 20-0110599 | | 7/1995 |
| KR | 10-1996-0700836 | A | 2/1996 |
| KR | 10-1997-0011595 | A | 3/1997 |
| KR | 1997-0011180 | | 7/1997 |
| KR | 98-0002291 | U | 3/1998 |
| KR | 1998-069721 | | 10/1998 |
| KR | 10-0574857 | | 4/2006 |
| KR | 10-2016-0139236 | A | 12/2016 |
| KR | 20-0485953 | | 3/2018 |

OTHER PUBLICATIONS

Extended European Search Report dated Apr. 18, 2024 for corresponding application No. 22781436.5.

Korean Office Action dated Jul. 19, 2025 for Korean Application No. 10-2021-0089562.

* cited by examiner

COOKING APPARATUS

CROSS-REFERENCE TO RELATED APPLICATION

This application is a continuation application, under 35 U.S.C. § 111(a), of international application No. PCT/KR2022/003632, filed on Mar. 15, 2022, which claims priority under 35 U. S. C. § 119 to Korean Patent Application No. 10-2021-0042338 filed on Mar. 31, 2021 and Korean Patent Application No. 10-2021-0089562 filed on Jul. 8, 2021, the disclosures of each of which are incorporated herein by reference in their entirety.

BACKGROUND

1. Field

The disclosure relates to a cooking apparatus, and for example, to a cooking apparatus having an inner housing in an enhanced structure.

2. Discussion of the Related Art

Cooking apparatuses are devices for cooking foods by heating, which provide various functions related to cooking, such as heating, thawing, drying, and sterilizing of an object to be cooked. The cooking apparatuses include, for example, ovens such as gas ovens or electric ovens, microwave heating devices (also referred to as microwaves), gas ranges, electric ranges, gas grills, or electric grills.

In general, the oven is an apparatus for cooking food by transferring heat directly to the food or heating the inside of the cooking chamber by means of a heating source that produces heat, such as a heater. The electric range is an apparatus for cooking food by frictional heat between molecules, which is produced by using high-frequency waves as a heating source to disturb molecular arrangement of the food.

The cooking apparatus may be configured to perform both the oven and electric range functions. For example, an object to be cooked may be heated in various ways in a cooking chamber with a heater arranged on one side and a magnetron arranged on the other side.

There may be a plurality of heaters so that a tray mounted in the cooking chamber may be arranged to include a plurality of cooking surfaces heated at different temperatures by the plurality of heaters. Along with this, a shelf installed on a lower side of the cooking chamber is placed above the magnetron for an object to be cooked to be placed thereon, thereby allowing high-frequency-wave based cooking.

The cooking apparatus may include an outer housing and an inner housing arranged to form the cooking chamber within the outer housing, and the inner housing may be formed by combining a front plate defining a front side of a main body of the cooking apparatus and a main plate arranged behind the front plate.

In this case, there is a need for preventing high-frequency waves inside the cooking chamber between the front plate and the main plate from leaking to the outside.

SUMMARY

The disclosure provides a cooking apparatus having a main plate and a front plate coupled by curling.

The disclosure also provides a cooking apparatus including a front plate having a portion protruding upward farther than a lower surface of a main plate.

According to an aspect of the disclosure, a cooking apparatus includes a cooking chamber, a heating source disposed below the cooking chamber to produce high-frequency waves, a main plate forming at least a portion of the cooking chamber and including a front side which is opened, a front plate coupled to the front side of the main plate and including a base having an opening connected to the cooking chamber, and a front coupling flange, bent rearward from an inner end of the base, coupled by curling with the main plate, and including a portion which protrudes above a lower surface of the main plate.

The front coupling flange may include a hemming portion bent at a position above the lower surface of the main plate and aligned with a rear surface of the base, and a plate coupling portion bent from the hemming portion and coupled with the main plate.

The cooking apparatus may further include a shelf installed at the lower surface of the main plate to cover an upper portion of the heating source and on which an object is placeable. The hemming portion may be disposed to cover a front of the shelf to prevent the shelf from falling out.

The front coupling flange may include a first curling hole having an oval shape, and a second curling hole having a circular shape and disposed separately from and adjacent to the first curling hole.

The first curling hole and the second curling hole may be formed in a section in which the hemming portion and the plate coupling portion join.

A length of a long side of the first curling hole may be 20 mm or less.

A gap between the first curling hole and the second curling hole may be 3 mm or more.

The main plate may include a main coupling flange extending forward from the lower surface and joined by curling with the plate coupling portion.

The main coupling flange may include a first flange portion disposed behind the plate coupling portion, and a second flange portion bent from the first flange portion and inserted into a space between the rear surface of the base and the plate coupling portion.

The front plate and the main plate may be coupled by pressurizing the main coupling flange and the plate coupling portion while the second flange portion is inserted into the space between the rear surface of the base and the plate coupling portion.

The plate coupling portion may include a guide protrusion which protrudes toward the first flange portion to guide a position of coupling with the main coupling flange.

The main coupling flange may further include a bending hole formed in a section in which the first flange portion and the second flange portion join. The bending hole may receive the guide protrusion.

The heating source may include a magnetron configured to produce the high-frequency waves and a rotatable stirrer configured to radiate the high-frequency waves produced from the magnetron in a plurality of directions.

The shelf may include a glass material.

The main plate may include a side plate disposed behind the front plate and coupled to a side edge of the opening, a lower plate disposed behind the front plate and coupled to a lower edge of the opening, and an upper plate disposed behind the front plate and coupled to an upper edge of the opening.

According to another aspect of the disclosure, a cooking apparatus includes a cooking chamber, a heating source disposed below the cooking chamber to produce high-frequency waves, a main plate forming at least a portion of the cooking chamber and including a front side which is opened, and a front plate coupled to the front side of the main plate and including a base having an opening connected to the cooking chamber. The main plate may include a main coupling flange extending forward from a lower surface of the main plate and coupled with the front plate, and the front plate may include a front coupling flange forming an edge of the opening by extending rearward from an inner end of the base and coupled with the main coupling flange, the front coupling flange including a hemming portion protruding upward so as to protrude above the lower surface of the main plate.

The front coupling flange may further include a plate coupling portion bent from the hemming portion and joined by curling with the main coupling flange.

The main coupling flange may include a first flange portion disposed behind the plate coupling portion, and a second flange portion bent from the first flange portion and inserted into a space between a rear surface of the base and the plate coupling portion.

According to another aspect of the disclosure, a cooking apparatus includes a cooking chamber, a heating source disposed below the cooking chamber to produce high-frequency waves, a main plate forming at least a portion of the cooking chamber inside and including a front side which is opened, and including a main coupling flange formed in a lower front portion of the main plate, a front plate coupled to the front side of the main plate and including a base having an opening connected to the cooking chamber and a front coupling flange bent rearward from an inner end of the base and joined by curling with the main coupling flange, and a shelf disposed at a lower surface of the main plate to cover an upper portion of the heating source. The shelf defines a bottom surface of the cooking chamber, and a front of the shelf is covered by the front coupling flange.

The front coupling flange may include a hemming portion bent rearward and aligned with a rear surface of the base to cover the front of the shelf, and a plate coupling portion bent from the hemming portion and separated from the rear side of the base and joined by curling with the main coupling flange.

BRIEF DESCRIPTION OF THE DRAWINGS

The above and other aspects, features, and advantages of the disclosure will become more apparent to those of ordinary skill in the art by describing example embodiments thereof with reference to the accompanying drawings, in which.

DETAILED DESCRIPTION

Figure 1:
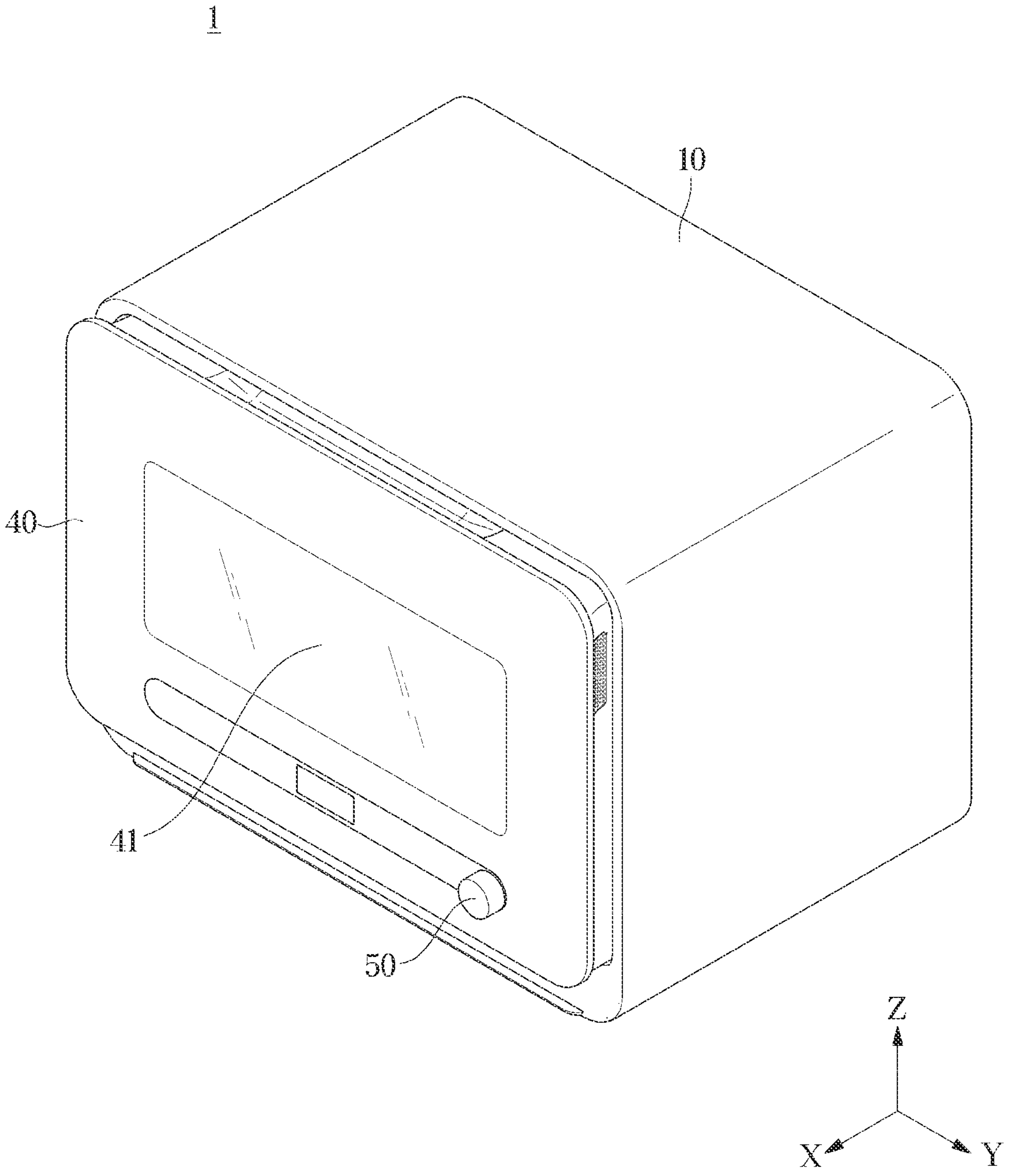
FIG. 1 is a perspective view of a cooking apparatus, according to an embodiment of the disclosure.

Embodiments and features as described and illustrated in the disclosure are merely examples, and there may be various modifications replacing the embodiments and drawings.

Throughout the drawings, like reference numerals refer to like parts or components.

The terminology used herein is for the purpose of describing example embodiments and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure. Descriptions shall be understood as to include any and all combinations of one or more of the associated listed items when the items are described by using the conjunctive term "~ and/or~," or the like.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A and B" is intended to include all of the following: (1) at least one of A, (2) at least one of B, and (3) at least one of A and at least one of B. Likewise, the scope of the expression or phrase "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

It will be understood that when an element is referred to as being "connected" to another element, the expression encompasses an example of a direct connection or direct coupling, as well as a connection or coupling with another element interposed therebetween.

Reference will now be made in detail to embodiments, examples of which are illustrated in the accompanying drawings, wherein like reference numerals refer to like elements throughout.

Figure 2:
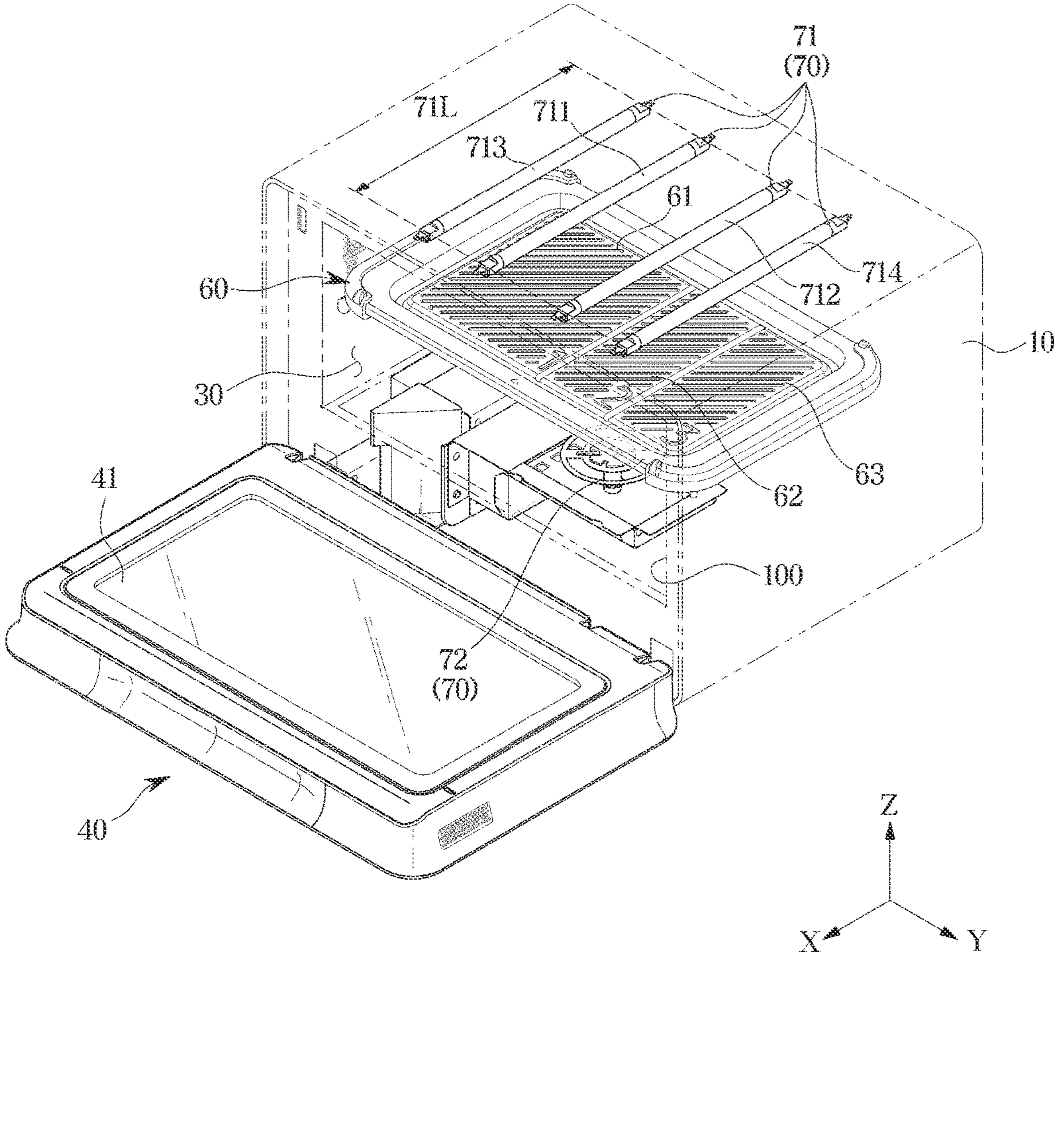
FIG. 2 illustrates part of an internal configuration of a cooking apparatus, according to an embodiment of the disclosure.
Figure 3:
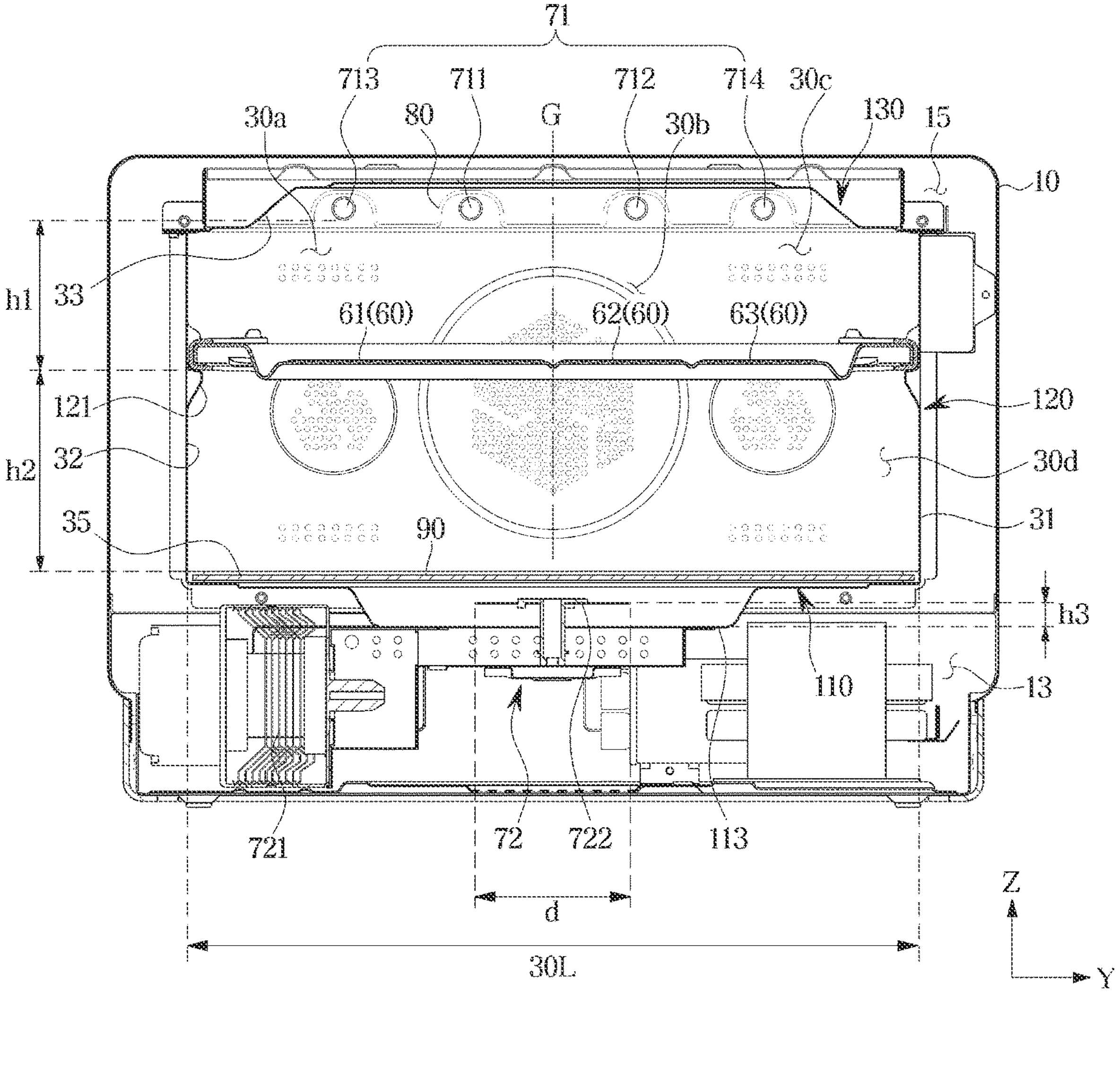
FIG. 3 is a cross-sectional view of a cooking apparatus in a Y direction, according to an embodiment of the disclosure.

FIG. 1 is a perspective view of a cooking apparatus, according to an embodiment of the disclosure. FIG. 2 illustrates part of an internal configuration of a cooking apparatus, according to an embodiment of the disclosure. FIG. 3 is a cross-sectional view of a cooking apparatus in a Y direction, according to an embodiment of the disclosure.

Referring to FIGS. 1 to 3, a cooking apparatus 1 may include an outer housing 10 defining an exterior, an inner housing 100 arranged inside the outer housing 10, and a cooking chamber 30 for receiving an object to be cooked.

The inner housing 100 may be arranged within the outer housing 10 to form the cooking chamber 30. There may be a gap between the inner housing 100 and the outer housing 10. The inner housing 100 and the outer housing 10 may be provided as a main body of the cooking apparatus 1.

The outer housing 10 and the inner housing 100 may be formed to be opened in a front or forward direction, i.e., in a first direction X, of the cooking apparatus 1.

The user may put an object to be cooked into the cooking chamber 30 through an opening 142 of the inner housing 100, which is formed in the first direction X.

The cooking chamber 30 may be shaped almost like a rectangular parallelepiped having long sides 30L in a second direction Y, which is perpendicular to the first direction X.

The cooking apparatus 1 may include a door 40 arranged to open or close the opening 142 of the outer housing 10 and the inner housing 100.

The door 40 may include an input module 50 through which the user may enter a signal to control the cooking apparatus 1. The input module 50 may not, however, be limited to such a form as shown in FIG. 1. For example, the input module 50 may include a display part (not shown) for displaying an image or a touch part (not shown) through which to enter a signal by touching the image.

The door 40 may include a transparent member 41 provided to allow the user to look inside of the cooking chamber 30.

The cooking apparatus 1 may include a tray 60 hung in the cooking chamber 30 for the user to place the object to be cooked thereon. The tray 60 may be detachably placed in the cooking chamber 30. For example, it is possible to take out the tray 60 through the opening 142 from the cooking chamber 30.

The cooking chamber 30 may include a plurality of tray receivers 121 formed on first and second sides 31 and 32, respectively, of the cooking chamber 30 for the tray 60 to be hung between upper and lower surfaces 33 and 35 of the cooking chamber 30. There may also be a plurality of tray supports 122 above the plurality of tray receivers 121. The plurality of tray receivers 121 and the plurality of tray supports 122 may be formed at different heights.

The tray receiver 121 and the tray support 122 may be formed by being sunken inward from a side surface of the inner housing 100. For example, they may be formed by being sunken from a side plate 120 (see FIG. 5) of the inner housing 100.

The tray 60 may include a plurality of cooking planes 61, 62 and 63, on which objects to be cooked may be placed. The plurality of cooking planes 61, 62 and 63 may be arranged to face the upper surface 33 of the cooking chamber 30 when the tray 60 is hung inside the cooking chamber 30.

The cooking apparatus 1 may include a plurality of heating sources 70 for providing heat into the cooking chamber 30 to cook the object by heat.

The plurality of heating sources 70 may be arranged to provide heat to the object placed on the tray 60 to cook the object. Furthermore, an object to be cooked may be placed on the bottom surface 35 of the cooking chamber 30 without the tray 60. For example, the object may be placed on an upper surface of a shelf 90 arranged on a lower surface 112 of the cooking apparatus 1. The upper surface of the shelf 90 may be provided to define the bottom surface 35 of the cooking chamber 30.

In this case, the plurality of heating sources 70 may provide heat to the object placed on the bottom surface 35. Alternatively, only one of the plurality of heating sources 70 may heat the object.

The plurality of heating sources 70 may include a first heating source 71 arranged on the upper side of the cooking chamber 30.

The plurality of heating sources 70 may include a second heating source 72 arranged on the lower side of the cooking chamber 30.

The first heating source 71 may include a plurality of heaters 711, 712, 713, and 714 for producing radiant heat. The plurality of heaters 711, 712, 713, and 714 may radiate heat produced by the heaters 711, 712, 713, and 714 themselves, thereby transferring the heat directly to the object. The plurality of heaters 711, 712, 713 and 714 may be installed on the upper side of the inner housing 100. For example, the plurality of heaters 711, 712, 713, and 714 may be installed at an upper plate 130 of the inner housing 100.

The second heating source 72 may include a magnetron 721 for producing high-frequency waves. The high-frequency waves produced by the magnetron 721 are emitted into the object to be cooked so that molecular arrangement of water contained in the object may be repeatedly converted. Accordingly, frictional heat between molecules of the object may cook the inside of the object.

The magnetron 721 may be arranged in a machine room 13. In the machine room 13, the second heating source 72 may oscillate high-frequency waves toward the bottom surface 35 of the cooking chamber 30, and the oscillating high-frequency waves may be radiated by a stirrer 722 to be emitted into the cooking chamber 30.

Accordingly, in the embodiment of the disclosure, the cooking apparatus 1 equipped with the first and second heating sources 71 and 72 may efficiently cook an object. It is also natural to select and drive only one of the first and second heating sources 71 and 72.

As the first heating source 71 is located on the upper side of the cooking chamber 30 as described above, the radiant heat may be efficiently transferred to an upper portion of an object to be cooked but the heat is hardly transferred to a lower portion of the object.

In this case, supplying additional heat to the lower portion of the object may cause inconvenience because the user has to stop driving the cooking apparatus 1 in operation, take out the tray 60 or the object from the cooking chamber 30, turn over the object, put the object back into the cooking chamber 30, and drive the cooking apparatus 1 again.

In the embodiment of the disclosure, however, the cooking apparatus 1 may include a heating portion arranged at the tray 60 to transfer heat even to the lower portion of the object during cooking.

The heating portion may be arranged on the opposite side to the plurality of cooking planes 61, 62, and 63 of the tray 60. The heating portion may be arranged to face the bottom surface 35 of the cooking chamber 30 while the tray 60 is hung in the cooking chamber 30.

The heating portion may produce heat by absorbing high-frequency waves produced by the magnetron 721. After absorbing the high-frequency waves radiated from the magnetron 721 that faces the heating portion, the heating portion may produce heat based on the absorbed high-frequency waves.

The heat produced in the heating portion may be transferred to the plurality of cooking planes 61, 62, and 63 of the tray 60.

For example, the heat produced in the heating portion arranged at the bottom of the tray 60 may be supplied to the lower portion of the object placed on the plurality of cooking planes 61, 62, and 63 while the heat is conducted to the plurality of cooking planes 61, 62, and 63.

The heating portion may be formed of ferrite to absorb the high-frequency waves. It is not, however, limited thereto, and the heating portion may be formed by a combination of ferrite and ceramic that is able to radiate heat based on the high-frequency waves.

Accordingly, the heat may be supplied to both the upper and lower portions of the object without a need for the user to turn over the object, thereby enabling efficient cooking.

The tray 60 may be arranged to partition the inner area of the cooking chamber 30.

The tray 60 may vertically partition the inner area of the cooking chamber 30 into first to third cooking sections 30*a*, 30*b*, and 30*c* formed above the tray 60 and a fourth cooking section 30*d* formed under the tray 60.

The first to third cooking sections 30*a*, 30*b*, and 30*c* may be arranged to place an object therein to be cooked by the first and second heating sources 71 and 72. For example, the object placed in the first to third cooking sections 30*a*, 30*b*, and 30*c* may be cooked by heat produced by the plurality of heaters 711, 712, 713, and 714 and the heating portion.

The fourth cooking section 30*d* may be provided to place an object therein to be cooked by the second heating source 72. The object placed in the fourth cooking section 30*d* may be cooked by high-frequency waves produced by the second heating source 72.

As the inside of the cooking chamber 30 is partitioned by the tray 60, it is possible to place and simultaneously cook objects to be cooked according to different cooking methods in the cooking chamber 30.

For example, even when an object to be cooked by external heat is placed in the first to third cooking sections 30*a*, 30*b*, and 30*c* and an object to be cooked by high-frequency waves is arranged in the fourth cooking section 30*d*, the first heating source 71 and the second heating source 72 may be activated at the same time to cook the objects simultaneously.

Accordingly, it is possible to simultaneously cook objects to be cooked according to different cooking methods, thereby increasing convenience of the user.

The tray 60 may have an area corresponding to a cross sectional area of the cooking chamber 30. Accordingly, the heat produced by the first heating source 71 may be partially prevented from being transferred from the first to third cooking sections 30*a*, 30*b*, and 30*c* to the fourth cooking section 30*d*.

Furthermore, the high-frequency waves oscillating in the fourth cooking section 30*d* may be partially prevented from being transferred from the fourth cooking section 30*d* to the first to third cooking sections 30*a*, 30*b*, and 30*c*.

Hence, the first to fourth cooking sections 30*a*, 30*b*, 30*c*, and 30*d* may perform cooking independently.

When the plurality of heaters 711, 712, 713, and 714 are arranged on the upper side of the cooking chamber 30 as in the embodiment of the disclosure, temperatures of heat produced from the respective heaters may be provided in a third direction Z in the cooking chamber 30 from the positions corresponding to the respective heaters.

For example, sections with different temperatures may be separately formed over the plurality of cooking planes 61, 62, and 63 of the tray 60.

That is, the plurality of cooking sections 30*a*, 30*b*, 30*c*, and 30*d* may be formed in the third direction Z at positions corresponding to the respective heaters from the plurality of cooking planes 61, 62, and 63. The respective cooking sections may be arranged to directly receive heat produced from the respective heaters.

Hence, when a plurality of objects to be cooked at different temperatures are placed in the cooking chamber 30 at the same time and arranged in the plurality of cooking sections 30*a*, 30*b*, 30*c*, and 30*d* of the plurality of cooking planes 61, 62, and 63 partitioned off by the difference in temperature, the objects may be cooked at different cooking temperatures.

That is, the objects placed in different sections may be cooked at different temperatures.

The cooking chamber 30 may be shaped like a rectangular parallelepiped with the long sides 30L running in the second direction Y, and the tray 60 matching the cooking chamber 30 may also include a rectangular cooking plane having the long sides 30L in the second direction and short sides in the first direction X.

The plurality of heaters 711, 712, 713, and 714 may be provided to include long shafts 71L extending in the first direction X, and may be arranged at certain intervals in the second direction Y, which corresponds to a direction of the long side 30L of the cooking chamber 30.

Accordingly, the plurality of cooking sections 30*a*, 30*b*, 30*c*, and 30*d* may be partitioned off along the second direction B to receive heat of different temperatures over the plurality of cooking planes 61, 62, and 63.

The plurality of heaters 711, 712, 713, and 714 and the plurality of cooking sections 30*a*, 30*b*, 30*c*, and 30*d* separated by the tray 60 to correspond to the heaters 711, 712, 713, and 714 in an embodiment of the disclosure will now be described in detail.

The plurality of heaters 711, 712, 713, and 714 may include four heaters: the first heater 711, the second heater 712, the third heater 713, and the fourth heater 714. The number of the heaters are not, however, limited thereto. For example, the heaters may include only the first and second heaters 711 and 712 or may include more than 4 heaters.

The first heater 711 may be arranged on one side in the second direction Y and the second heater 712 may be arranged on the other side in the second direction Y.

For example, based on a center line G of the cooking plane in the second direction Y[E1], the first heater 711 may be placed on one side and the second heater 712 may be placed on the other side. The third heater 713 may be arranged to be adjacent to the first heater 711 on the one side, and the fourth heater 714 may be arranged to be adjacent to the second heater 712 on the other side.

The first and third heaters 711 and 713 may be provided to produce the same temperatures of heat. The second and fourth heaters 712 and 714 may be provided to produce the same temperatures of heat.

The first and third heaters 711 and 713, and the second and fourth heaters 712 and 714 may be provided to transfer different temperatures of heat. In other words, temperatures transferred from the one side and the other side based on the center line G may be different.

The temperatures themselves of the heat produced by the plurality of heaters 711, 712, 713, and 714 may all be the same. While in operation, the cooking apparatus 1 may control the plurality of heaters 711, 712, 713, and 714 by constantly driving the first and third heaters 711 and 713 and repeatedly turning on and off the second and fourth heaters 712 and 714.

On the contrary, the cooking apparatus 1 may control the plurality of heaters 711, 712, 713, and 714 by repeatedly turning on and off the first and third heaters 711 and 713 and constantly driving the second and fourth heaters 712 and 714.

Accordingly, a total temperature of heat produced by the first and second heaters 711 and 713 and a total temperature of heat produced by the second and fourth heaters 712 and 714 may be different.

It is not, however, limited thereto, and temperatures themselves of heat produced by the first and second heaters 711 and 713 and the second and fourth heaters 712 and 714 may be different.

In an embodiment of the disclosure, as the plurality of heaters 711, 712, 713, and 714 of the cooking apparatus 1 are arranged at certain intervals in the second direction Y, the first to third cooking planes 60, 62, and 63 may be partitioned off in the second direction Y.

The first to third cooking sections 30*a*, 30*b*, and 30*c* may be separated by the first and third heaters 711 and 713 and the second and fourth heaters 714 to have different cooking temperatures in the second direction Y, which is a left-right direction.

For example, the first cooking section 30*a* may be provided to correspond to the first and third heaters 711 and 713, and the second and third cooking sections 30*b* and 30*c* may be provided to correspond to the second and fourth heaters 712 and 714.

The first cooking section 30*a* may be provided to correspond to the first cooking plane 61 of the tray 60, the second cooking section 30*b* may be provided to correspond to the second cooking plane 62 of the tray 60, and the third cooking section 30*c* may be provided to correspond to the third cooking plane 63 of the tray 60.

Accordingly, different objects to be cooked may be simultaneously cooked in the first to third cooking sections 30*a*, 30*b*, and 30*c*. Furthermore, an object in the fourth cooking section 30*d* may also be cooked at the same time.

A first object to be cooked in the first cooking section 30*a*, a second object to be cooked in the second cooking section 30*b*, a third object to be cooked in the third cooking section 30*c*, and a fourth object to be cooked in the fourth cooking section 30*d* may be cooked at different external temperatures and high-frequency waves, respectively.

That is, objects having different cooking methods or different cooking temperatures may be simultaneously cooked in the single cooking chamber 30.

It is not, however, limited thereto, and more or fewer objects having different cooking methods or different cooking temperatures may be simultaneously cooked.

The tray 60 may be arranged to be closer to the first heating source 71 than to the second heating source 72 in the third direction Z.

For example, distance h1 from the plurality of cooking planes 61, 62, and 63 of the tray 60 to the plurality of heaters 711, 712, 713, and 714 may be shorter than distance h2 from the plurality of cooking planes 61, 62, and 63 to the bottom surface 35 of the cooking chamber 30.

This is to more efficiently partition off into the first to third cooking sections 30*a*, 30*b*, and 30*c*.

The cooking apparatus 1 may include reflective members 80 provided to transfer heat produced by the first and third heaters 711 and 713 into the first cooking section 30*a* and transfer heat produced by the second and fourth heaters 712 and 714 into the second and third cooking sections 30*b* and 30*c*.

The reflective members 80 may be arranged over the plurality of heaters 711, 712, 713, and 714 in the third direction Z. The reflective members 80 may each have the form of covering an upper portion of each heater. Accordingly, heat produced by each of the plurality of heaters 711, 712, 713, and 714 may be concentrated downward.

The second heating source 72 may include a stirrer 722 provided to mix and uniformly radiate oscillating high-frequency waves from the magnetron to the cooking chamber 30.

The stirrer 722 may be shaped like a circle having a cut portion 114, and arranged to radiate the high-frequency waves directed toward only one side of the cooking apparatus 30 in all directions to reach every corner in the cooking chamber 30.

The stirrer 722 may have a certain length of distance in the third direction Z from the circumference of the stirrer 722 to an installation plane 113 on which the stirrer 722 is installed. When the cooking chamber 30 has a volume of about 20 L to 30 L, a distance h3 from the installation plane 113 to the circumference of the stirrer 722 may be around 30 mm.

The shelf 90 may be placed at the lower surface 112 of the inner housing 100 to cover an upper portion of the stirrer 722. The shelf 90 may be arranged to define the bottom surface 35 of the cooking chamber 30. An object to be cooked may be placed on the upper surface of the shelf 90 and cooked in the fourth cooking section 30*d*.

Figure 4:
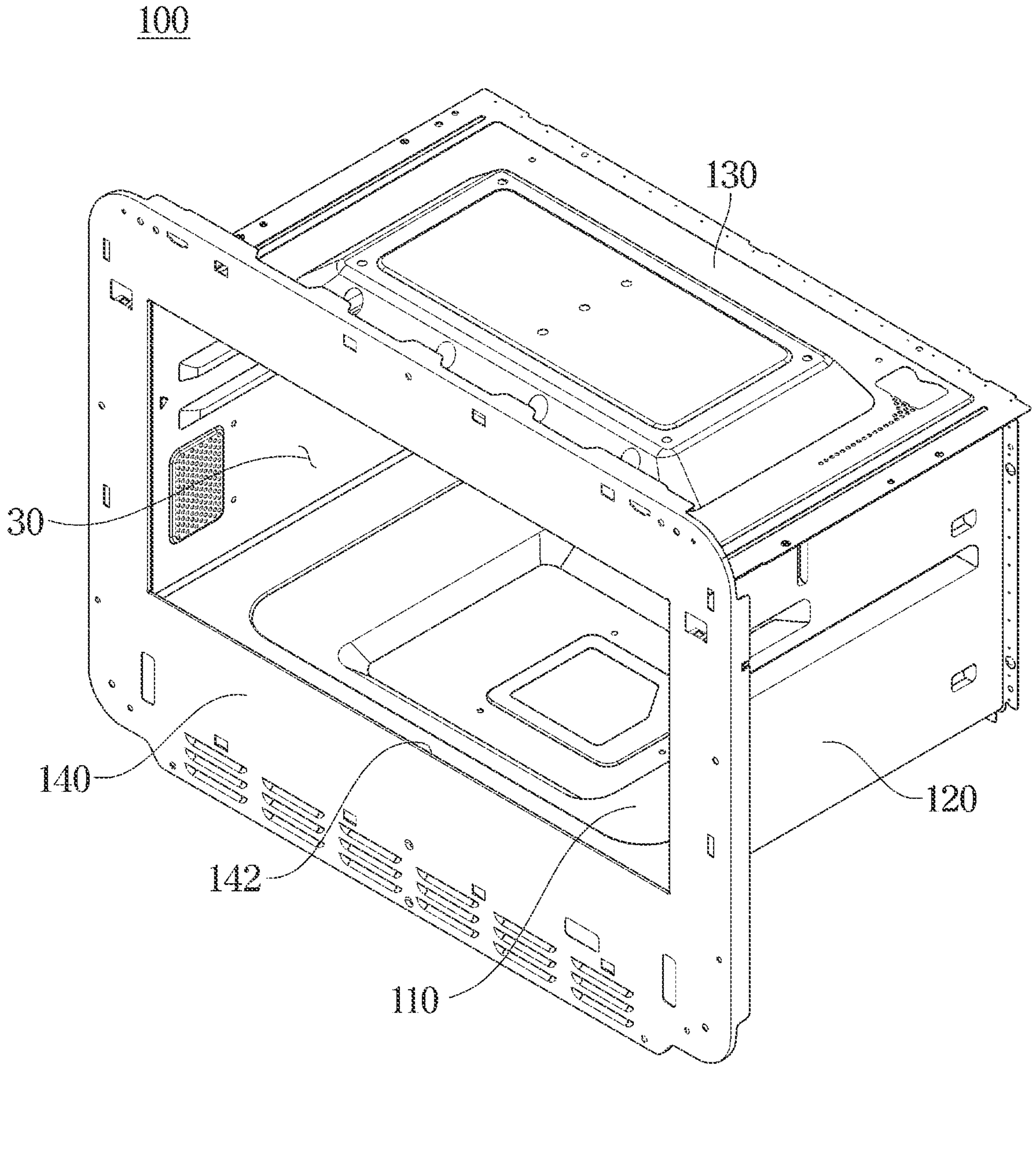
FIG. 4 illustrates an inner housing of a cooking apparatus, according to an embodiment of the disclosure.
Figure 5:
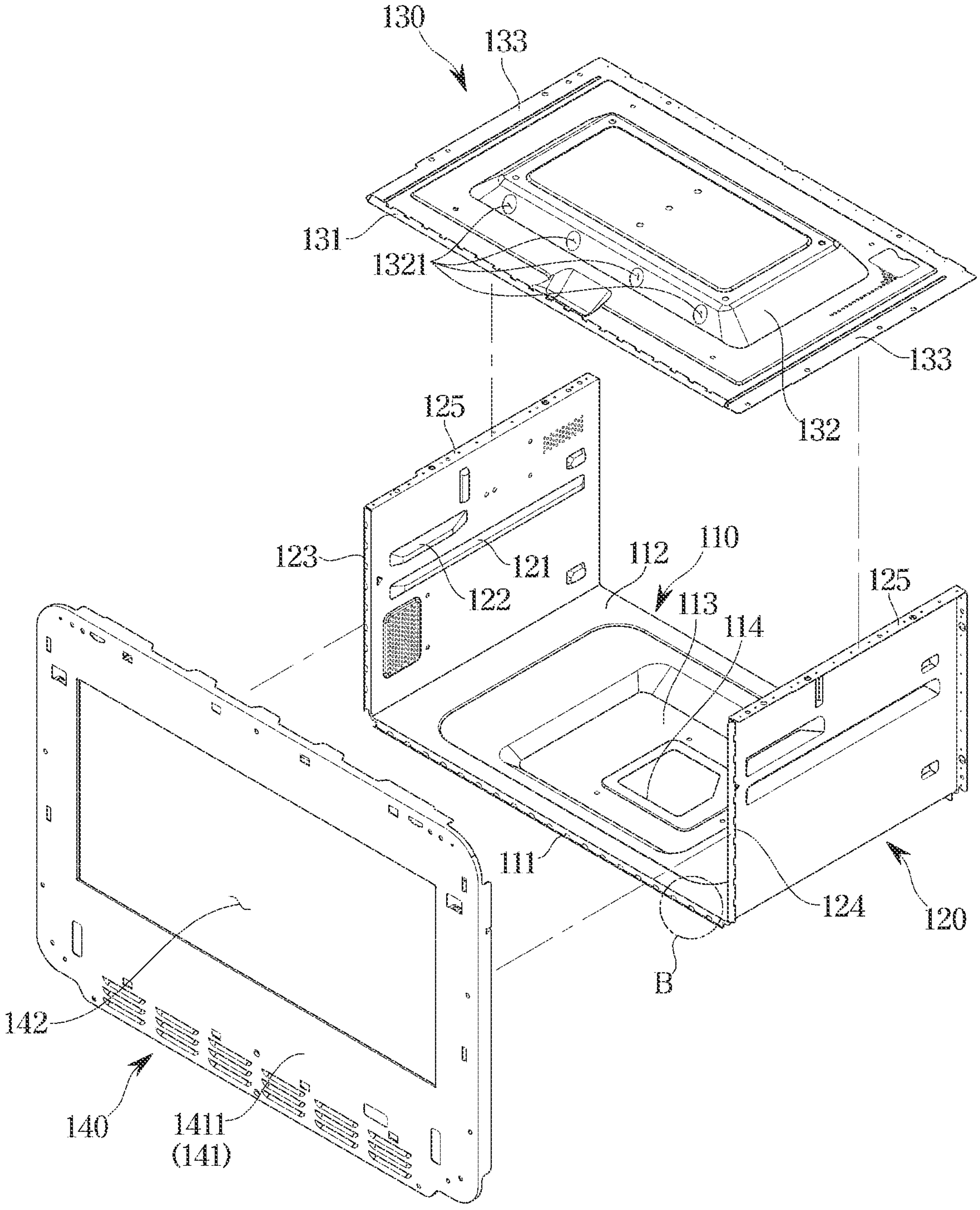
FIG. 5 is an exploded view of part of the configuration of FIG. 4.

FIG. 4 illustrates an inner housing of a cooking apparatus, according to an embodiment of the disclosure. FIG. 5 is an exploded view of part of the configuration of FIG. 4.

Referring to FIGS. 4 and 5, the inner housing 100 may be provided by combining the plurality of plates 110, 120, 130, and 140 together. For example, the inner housing 100 may include a front plate 140 defining a front side of the main body of the cooking apparatus 1, and a main plate 110, 120, and 130 coupled to edges of the opening 142 of the front plate 140.

The front plate 140 may include the opening 142 connected to the cooking chamber 30. The front plate 140 may include a base 141 on which the opening 142 is formed. The base 141 may include a base front surface 1411 and a base rear surface 1412.

The opening 142 of the front plate 140 may be formed by being cut out to be connected to the cooking chamber 30 formed by the main plates 110, 120 and 130 coupled to the rear side of the front plate 140.

The main plate 110, 120, and 130 may include a side plate 120, a lower plate 110, an upper plate 130 and a rear plate (not shown).

The main plate 110, 120, and 130 may be arranged to form the cooking chamber 30 inside. For example, the main plate 110, 120, and 130 may be provided to have the front side opened. The main plate 110, 120, and 130 may be shaped almost like a rectangular parallelepiped.

The lower plate 110 may define the lower surface 112 of the inner housing 100. The lower plate 110 may include a first main coupling flange 111 coupled by curling with a first front coupling flange 143, which will be described later.

The first main coupling flange 111 may be provided to extend forward from the lower surface 112 of the lower plate 110. The first main coupling flange 111 may be formed by being bent from the lower surface 112 of the lower plate 110. Details of the first main coupling flange 111 will be described later.

The lower plate 110 may include an installation plane 113 sunken (recessed) downward from the lower surface 112. The stirrer 722 may be rotationally arranged on the installation plane 113.

The lower plate 110 may include the cut portion 114 formed on the installation plate 113. The stirrer 722 may be rotationally arranged on the lower side of the cooking apparatus 30 by being inserted to the inside of the inner housing 100 from the machine room 13 through the cut portion 114.

The side plate 120 may be provided to define side surfaces of the inner housing 100. The side plate 120 may include a second main coupling flange 123 and a third main coupling flange 124 arranged to be coupled by curling with second and third front coupling flanges 144 and 145, respectively, which will be described below. The second main coupling flange 123 may be formed by extending forward from an inner surface on one side of the side plate 120. The third main coupling flange 124 may be formed by extending forward from an inner surface on the other side of the side plate 120.

The side plate 120 may be provided to have the tray receiver 121 and the tray support 122 formed thereon. For example, the tray receiver 121 and the tray support 122 may be formed by being sunken inward from the outer surface of the side plate 120.

The side plate 120 may be provided in pair to define both sides of the cooking chamber 30.

The side plate 120 may include a side joining portion 125 formed on either top end. The side joining portions 125 and upper joining portions 133 of the upper plate, which will be described below, may be coupled together by welding. The side joining portion 125 and the upper joining portion 133 are formed at the inner housing 100 not to be exposed to the user, so there may be various methods of coupling between the side joining portion 125 and the upper joining portion 133.

The upper plate 130 may be arranged to define the upper surface 33 of the cooking chamber 30. The upper plate 130 may include a fourth main coupling flange 131 provided to be coupled by curling with a fourth front coupling flange 146, which will be described later.

The fourth main coupling flange 131 may be formed by extending forward from an inner surface of upper plate 130.

The upper plate 130 may include a heater receiver 132. The heater receiver 132 may be formed by being sunken outward from the inner side of the upper plate 130. The heater receiver 132 may be provided to form a receiving space to accommodate the plurality of heaters 711, 712, 713, and 714.

A plurality of heater passing holes 1321 may be formed on one side of the heater receiver 132 for the plurality of heaters 711, 712, 713, and 714 received therein to pass through. With this structure, e.g., electric wires (not shown) to supply power to the plurality of heaters 711, 712, 713, and 714 may be connected to the plurality of heaters 711, 712, 713, and 714.

The upper plate 130 may include the upper joining portion 133 formed at either side end of the upper plate 130. The upper joining portion 133 may be provided to join with the side junction portion 125 of the side plate 120. For example, the upper joining portion 133 may be coupled with the side joining portion 125 by welding. The coupling method is not, however, limited thereto.

As shown in FIG. 5, the side plates 120 and the lower plate 110 may be integrally formed. It is not, however, limited thereto. For example, the side plates 120 and the lower plate 110 may be provided separately. In this case, the side plates 120 and the lower plate 110 may be coupled by e.g., welding.

The front plate 140 and the main plate 110, 120, and 130, which constitute the inner housing 100, may include stainless steel. This may allow high-frequency waves to be repetitively moved inside the cooking chamber 30, thereby supplying hot heat in a short period. Furthermore, with the stainless steel, the cooking apparatus 1 may have aesthetically better appearance.

Figure 6:
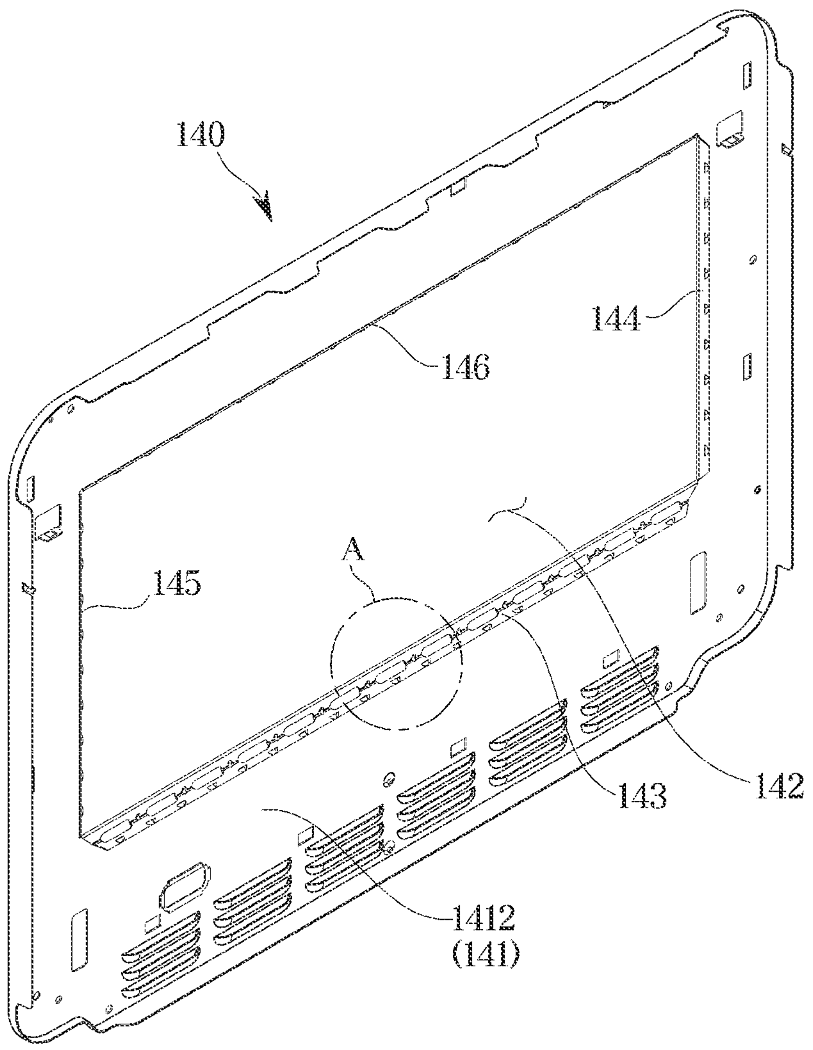
FIG. 6 is a rear view of a front plate of FIG. 5.
Figure 7:
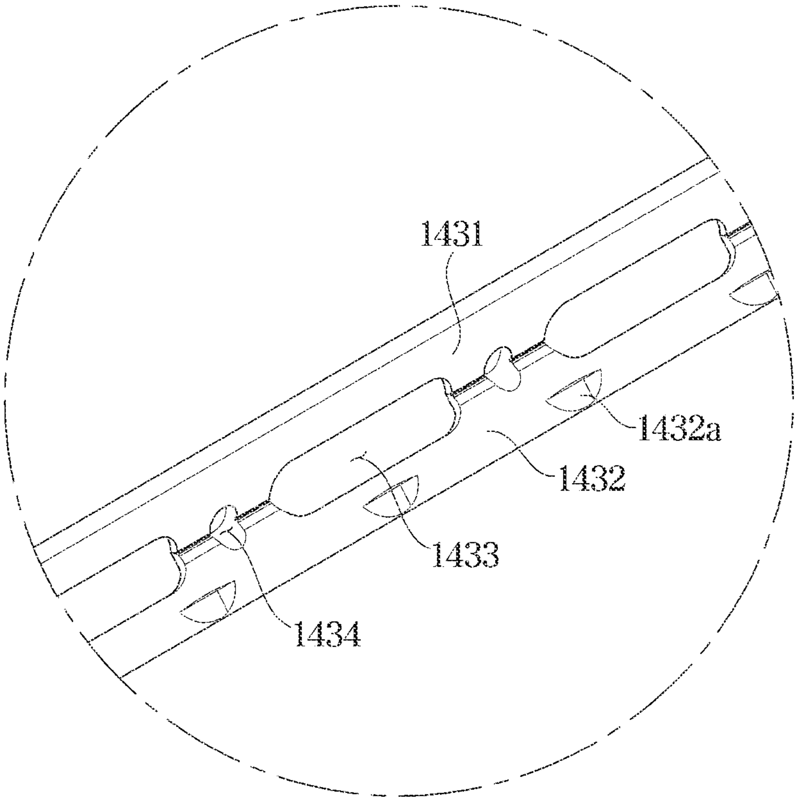
FIG. 7 is an enlarged view of portion A of FIG. 6.
Figure 8:
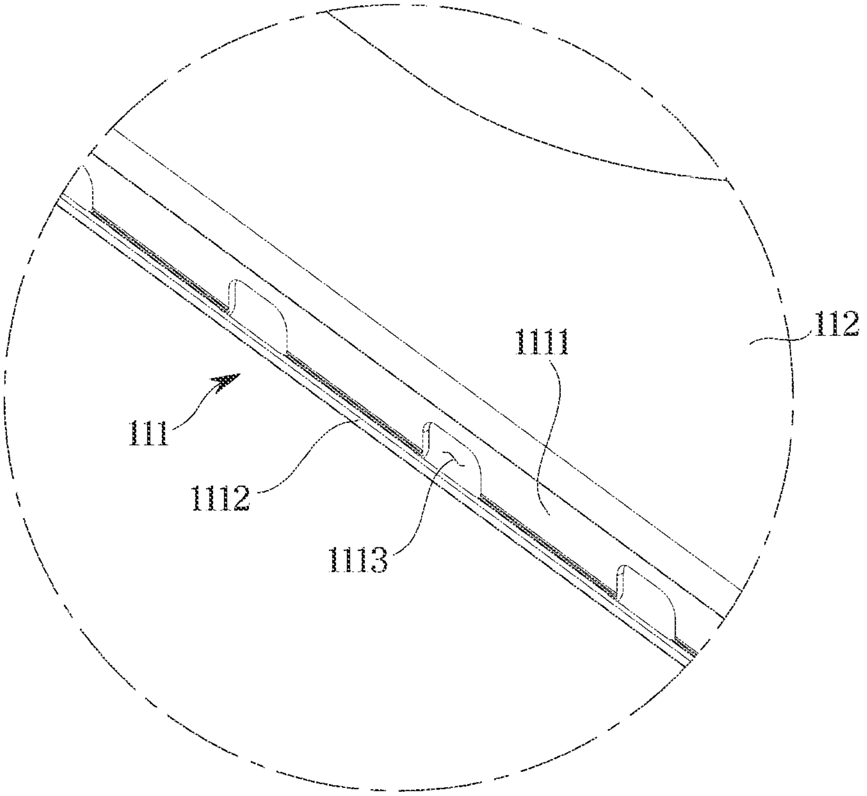
FIG. 8 is an enlarged view of portion B of FIG. 5.

FIG. 6 is a rear view of the front plate of FIG. 5. FIG. 7 is an enlarged view of portion A of FIG. 6. FIG. 8 is an enlarged view of portion B of FIG. 5.

Referring to FIGS. 6 to 8, the front plate 140 may include a plurality of front coupling flanges 143, 144, 145, and 146. The plurality of front coupling flanges 143, 144, 145, and 146 may include a first front coupling flange 143, a second front coupling flange 144, a third front coupling flange 145, and a fourth front coupling flange 146.

The first to fourth front coupling flanges 143 to 146 may be provided by being bent rearward from inner ends of the base 141.

The first front coupling flange 143 may be formed at a lower edge of the opening 142 of the front plate 140. The first front coupling flange 143 may be formed by being bent rearward from the base 141 of the front plate 140. The first front coupling flange 143 may be bent from the base 141 in a direction toward the base rear surface 1412. The first front coupling flange 143 may be provided to be coupled with the first main coupling flange 111 of the lower plate 110. This will be described later in detail.

The second front coupling flange 144 may be formed by being bent rearward from the base 141 of the front plate 140. The second front coupling flange 144 may be formed at one side edge of the opening 142 of the front plate 140. The second front coupling flange 144 may be bent from the base 141 in a direction toward the base rear surface 1412. The second front coupling flange 144 may be provided to be coupled by curling with the second main coupling flange 123 of the side plate 120.

The third front coupling flange 145 may be formed by being bent rearward from the base 141 of the front plate 140. The third front coupling flange 145 may be formed at the other side edge of the opening 142 of the front plate 140. The third front coupling flange 145 may be arranged to face the second front coupling flange 144. The third front coupling flange 145 may be bent from the base 141 in a direction toward the base rear surface 1412. The third front coupling flange 145 may be provided to be coupled by curling with the third main coupling flange 124 of the side plate 120.

The fourth front coupling flange 146 may be formed by being bent rearward from the base 141 of the front plate 140. The fourth front coupling flange 146 may be arranged to face the first front coupling flange 143. The fourth front coupling flange 146 may be formed at an upper edge of the opening 142 of the front plate 140. The fourth front coupling flange 146 may be bent from the base 141 in a direction toward the base rear surface 1412. The fourth front coupling flange 146 may be provided to be coupled by curling with the fourth main coupling flange 131 of the upper plate 130.

With this structure, the opening 142 of the front plate 140 may be provided to be connected to the inside of the cooking chamber 30, in which case, there may be no assembly gap between the front plate 140 and the main plate 110, 120 and 130 as the front plate 140 and the main plate 110, 120 and 130 are coupled by curling.

A structure of the first front coupling flange 143 and the first main coupling flange 111 to be coupled with the first front coupling flange 143 will now be described.

The first front coupling flange 143 may include a hemming portion 1431 and a plate coupling portion 1432.

The hemming portion 1431 may be bent rearward from the base 141. The hemming portion 1431 may be formed to be in parallel with the base rear surface 1412 of the base 141.

The plate coupling portion 1432 may be bent from the hemming portion 1431 to be coupled with the main plate 110, 120 and 130. For example, the plate coupling portion 1432 may be provided to be coupled with the first main coupling flange 111 of the lower plate 110.

The plate coupling portion 1432 may include a guide protrusion 1432*a*. The guide protrusion 1432*a* may be formed by lancing processing of part of the plate coupling portion 1432. The guide protrusion 1432*a* may be arranged to protrude toward a first flange portion 1111, which will be described later. The guide protrusion 1432*a* may be arranged to be inserted to a bending hole 1113 (see FIG. 8) of the first main coupling flange 111.

This may guide the front plate 140 and the main plate 110, 120, and 130 into a correct coupling position.

The first front coupling flange 143 may include a first curling hole 1433 and a second curling hole 1434.

The first curling hole 1433 may be formed in an oval shape with long and short sides. The second curling hole 1434 may be arranged separately from and side by side with the first curling hole 1433. The second curling hole 1434 may be formed in a circular shape.

The first and second curling holes 1433 and 1434 may be formed in a section in which the hemming portion 1431 and the plate coupling portion 1432 join.

The first and second curling holes 1433 and 1434 may each be provided in plural to assist in bending of the plate coupling portion 1432 relative to the hemming portion 1431.

With the first and second curling holes 1433 and 1434 formed, deformation of the appearance of the front plate 140 made of the stainless steel may be prevented. Furthermore, the high-frequency waves may be prevented from leaking to the outside by adjusting a width of the first curling hole 1433 and the gap between the first and second curling holes 1433 and 1434. This will be described later in detail.

The first main coupling flange 111 may include a first flange portion 1111 and a second flange portion 1112.

The first flange portion 1111 may be arranged behind the plate coupling portion 1432. For example, the first flange portion 1111 may be formed by being bent outward from the lower surface 112 of the lower plate 110.

The second flange portion 1112 may be bent inward from the first flange portion 1111 to be inserted into a space between the base rear surface 1412 and the plate coupling portion 1432.

The first main coupling flange 111 may include the bending hole 1113.

The bending hole 1113 may be formed in a section where the first and second flange portions 1111 and 1112 join. The bending hole 1113 may be provided to receive the guide protrusion 1432*a* of the plate coupling portion 1432.

Figure 9:
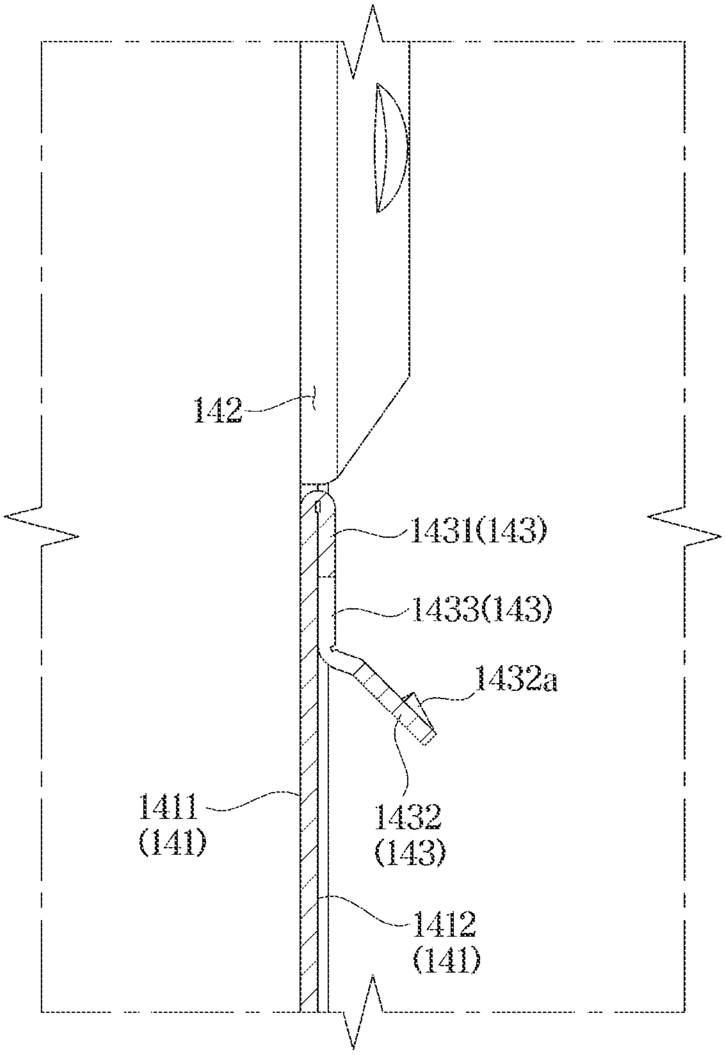
FIGS. 9 to 11 illustrate a procedure of coupling by curling between a front coupling flange and a main coupling flange in a cooking apparatus, according to an embodiment of the disclosure.
Figure 10:
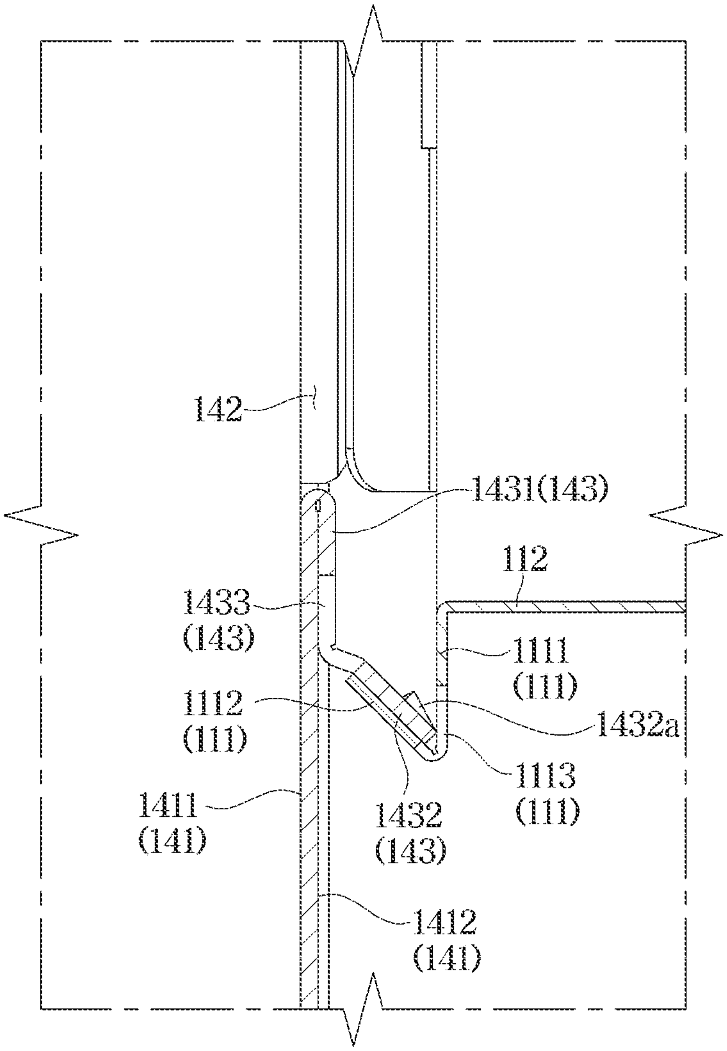
Figure 11:
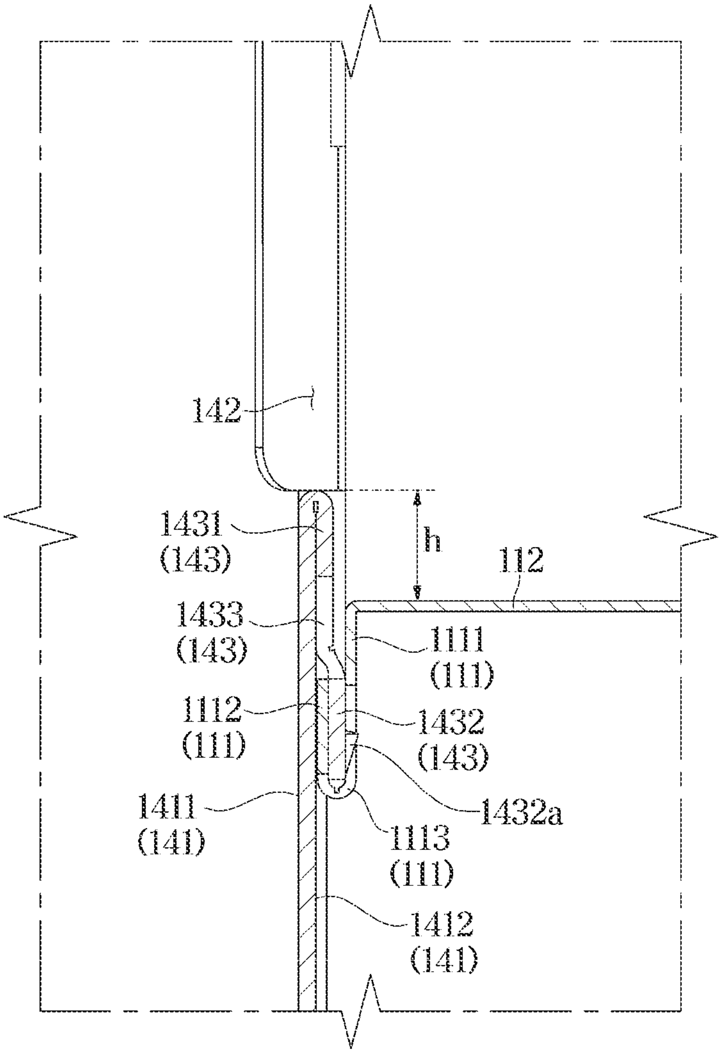

FIGS. 9 to 11 illustrate a procedure of coupling by curling between a front coupling flange and a main coupling flange in a cooking apparatus, according to an embodiment of the disclosure.

The procedure of coupling by curling between the first front coupling flange 143 and the first main coupling flange 111 in a cooking apparatus will now be described in connection with a cross-sectional view.

Referring to FIG. 9, the hemming portion 1431 of the first front coupling flange 143 may be bent rearward from an inner end of the base 141. The hemming portion 1431 may be formed at a lower edge of the opening 142 of the front plate 140. The hemming portion 1431 may be bent to be aligned with the base rear surface 1412. For example, the hemming portion 1431 may be arranged to come into contact with the base rear surface 1412.

The plate coupling portion 1432 may be bent rearward from the hemming portion 1431. As the first curling hole 1433 is formed between the hemming portion 1431 and the plate coupling portion 1432, deformation of the front plate 140 may be minimized when the plate coupling portion 1432 is bent relative to the hemming portion 1431. Furthermore, the bending may be more easily done without much force.

Referring to FIG. 10, an ending portion of the first main coupling flange 111 of the lower plate 110 is inserted to the space between the base rear surface 1412 and the plate coupling portion 1432. For example, the second flange portion 1112 of the first main coupling flange 111 is inserted to the space between the base rear surface 1412 and the plate coupling portion 1432.

Referring to FIG. 11, the front plate 140 and the main plate 110, 120 and 130 may be coupled by curling by pressurizing the first main coupling flange 111 and the plate coupling portion 1432 while the second flange portion 1112 is inserted to the space between the plate coupling portion 1432 and the base rear surface 1412. One side of the second flange portion 1112 may be arranged to be in contact with the base rear surface 1412, and the other side of the second flange portion 1112 may be arranged to be in contact with the plate coupling portion 1432. In this case, the guide protrusion 1432*a* may be inserted to the bending hole 1113 of the first main coupling flange 111.

The first front coupling flange 111 may be arranged to protrude upward father than the lower surface 112 of the lower plate 110. For example, the hemming portion 1431 of the front coupling flange may be bent at a higher position than the lower surface 112 of the lower plate 110.

In other words, the front coupling flange may be arranged to protrude farther than the lower surface 112 of the lower plate 110 by a certain height h. With this, the front coupling flange may be provided to cover the front of the shelf 90 mounted at the lower surface 112 of the lower plate 110. Accordingly, the shelf 90 may be prevented from falling out forward.

Figure 12:
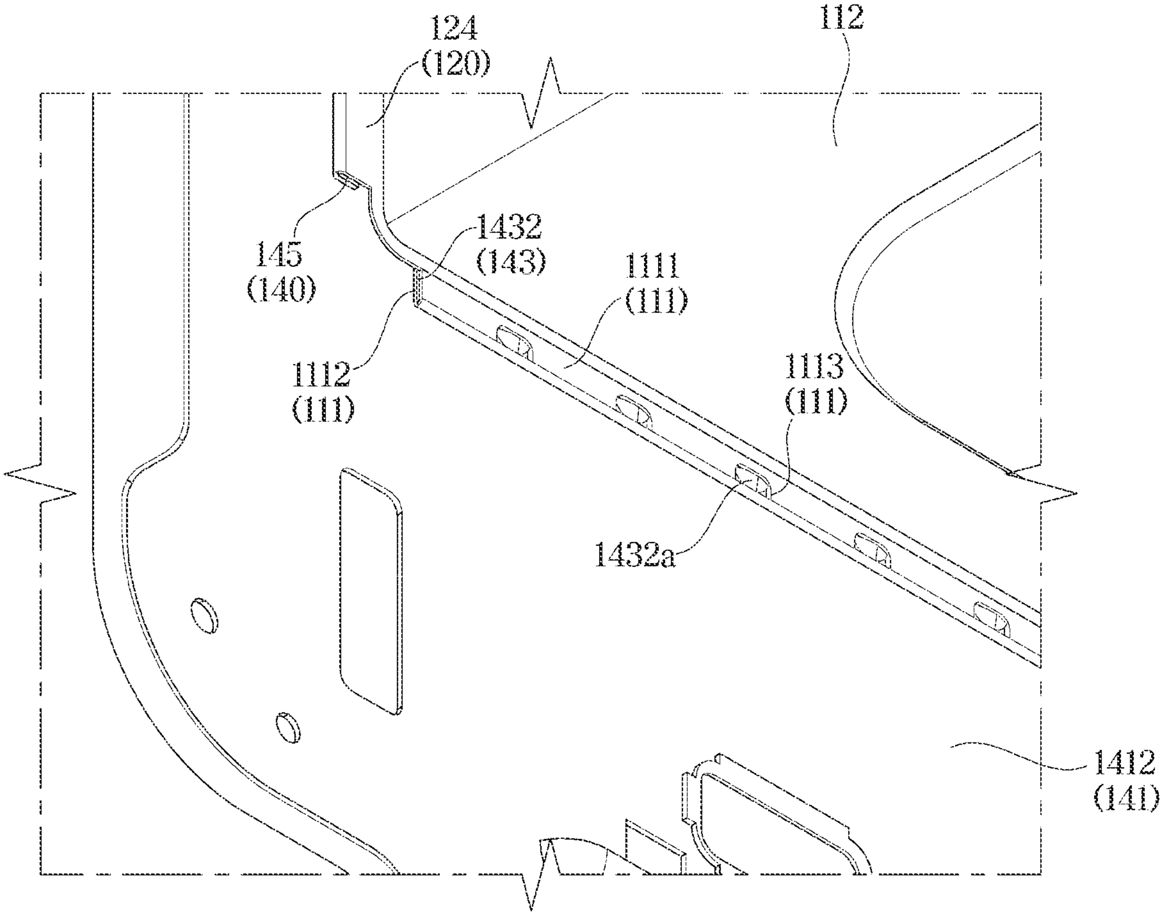
FIG. 12 is a rear view of a state of coupling by curling between a front coupling flange and a main coupling flange in a cooking apparatus, according to an embodiment of the disclosure.

FIG. 12 is a rear view of a state of coupling by curling between a front coupling flange and a main coupling flange in a cooking apparatus, according to an embodiment of the disclosure.

Referring to FIG. 12, as the first main coupling flange 111 of the lower plate 110 and the first front coupling flange 143 of the front plate 140 are coupled, the front plate 140 and the lower plate 110 may be securely coupled. Furthermore, the third main coupling flange 124 of the side plate 120 and the third front coupling flange 145 of the front plate 140 may be coupled by curling. Although not shown, the second main coupling flange 123 of the side plate 120 and the third front coupling flange 145 of the front plate 140 may also be coupled by curling, and the fourth main coupling flange 131 of the upper plate 130 and the fourth front coupling flange 146 of the front plate 140 may also be coupled by curling.

The guide protrusion 1432*a* may be received in the bending hole 1113. Hence, even when external force is applied to the front plate 140 and the lower plate 110, coupling between the front plate 140 and the lower plate 110 may not be released because they are securely coupled.

Figure 13:
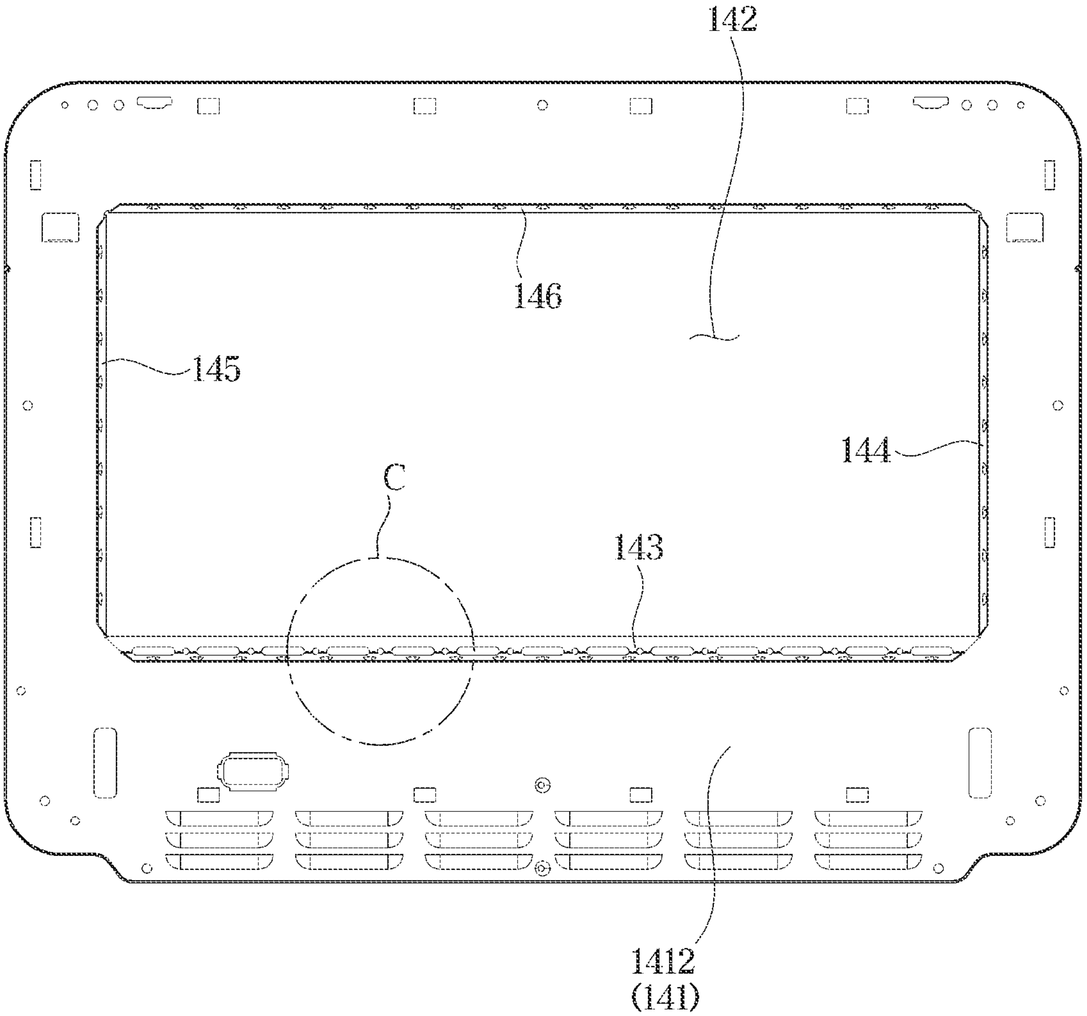
FIG. 13 is a rear view of a front plate of FIG. 5.
Figure 14:
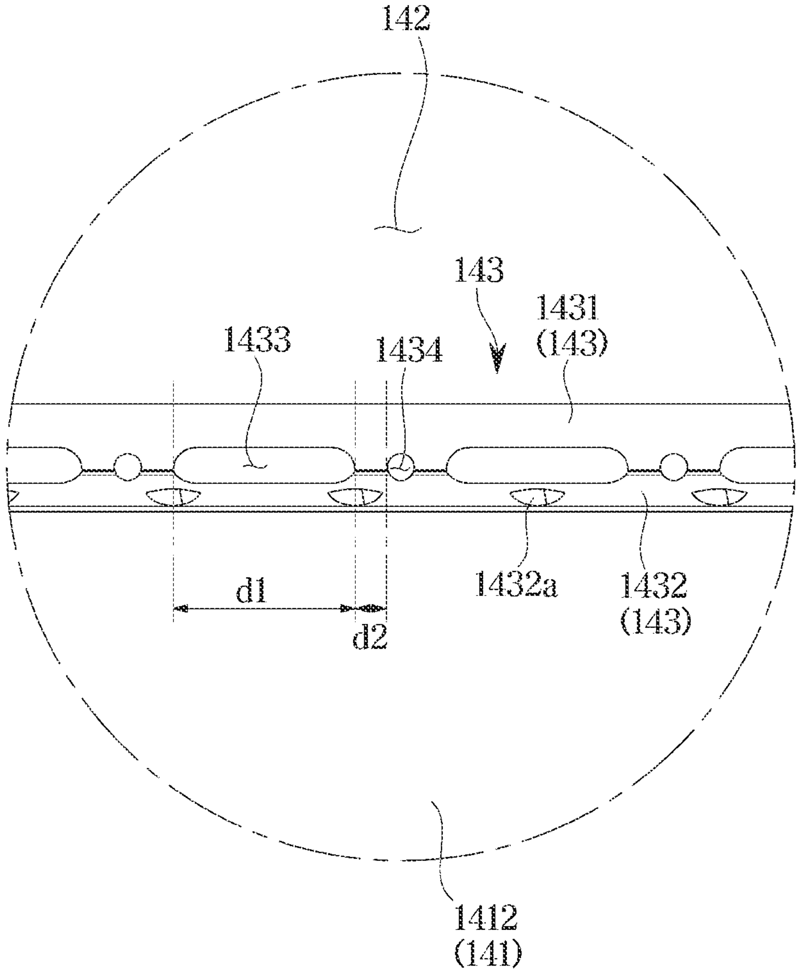
FIG. 14 is an enlarged view of portion C of FIG. 13.

FIG. 13 is a rear view of a front plate of FIG. 5. FIG. 14 is an enlarged view of portion C of FIG. 13.

Referring to FIGS. 13 and 14, the front plate 140 may include the first front coupling flange 143, second front coupling flange 144, third front coupling flange 145, and fourth front coupling flange 146 formed at edges of the opening 142. As described above, each of the front coupling flange may be coupled by curling with the main coupling flanges of the main plate 110, 120, and 130.

Referring to FIG. 14, length d1 of the long side of the first curling hole 1433 may be about 20 mm or less. In other words, the cut width of the first curling hole 1433 may be about 20 mm or less.

When the first curling hole 1433 is formed to be too large in size, a strength for bending decreases, causing assembly tolerance between the front plate 140 and the main plate 110, 120, and 130. In this case, there is concern that the high-frequency waves of the cooking chamber 30 leak out.

Furthermore, when the first curling hole 1433 is formed to be too small in size, the strength for bending increases, causing deformation of the front plate 140. The front plate 140 is a part exposed to the user, which may become a factor of disrupting aesthetic impressions.

Hence, the cooking apparatus 1 according to an embodiment of the disclosure may have the first curling hole 1433 with the long side having a length d1 of 20 mm, to prevent a leak of electric waves and facilitating bending of the front plate 140.

The first curling hole 1433 and the second curling hole 1434 may be alternately arranged at regular intervals.

A distance d2 between the first curling hole 1433 and the second curling hole 1434 may be about 3 mm or more. When the distance d2 between the first curling hole 1433 and the second curling hole 1434 is less than 3 mm, the strength for bending may be reduced. This may increase a probability of the high-frequency waves leaking out.

Hence, in an embodiment of the disclosure, the cooking apparatus 1 includes the first curling hole 1433 with the long side having the length d1 of 20 mm or less and the second curling hole 1434 having a distance d2 of 3 mm or more to the first curling hole 1433, to prevent a leak of high-frequency waves in the cooking chamber 30 and facilitate bending of the first front coupling flange 143.

Figure 15:
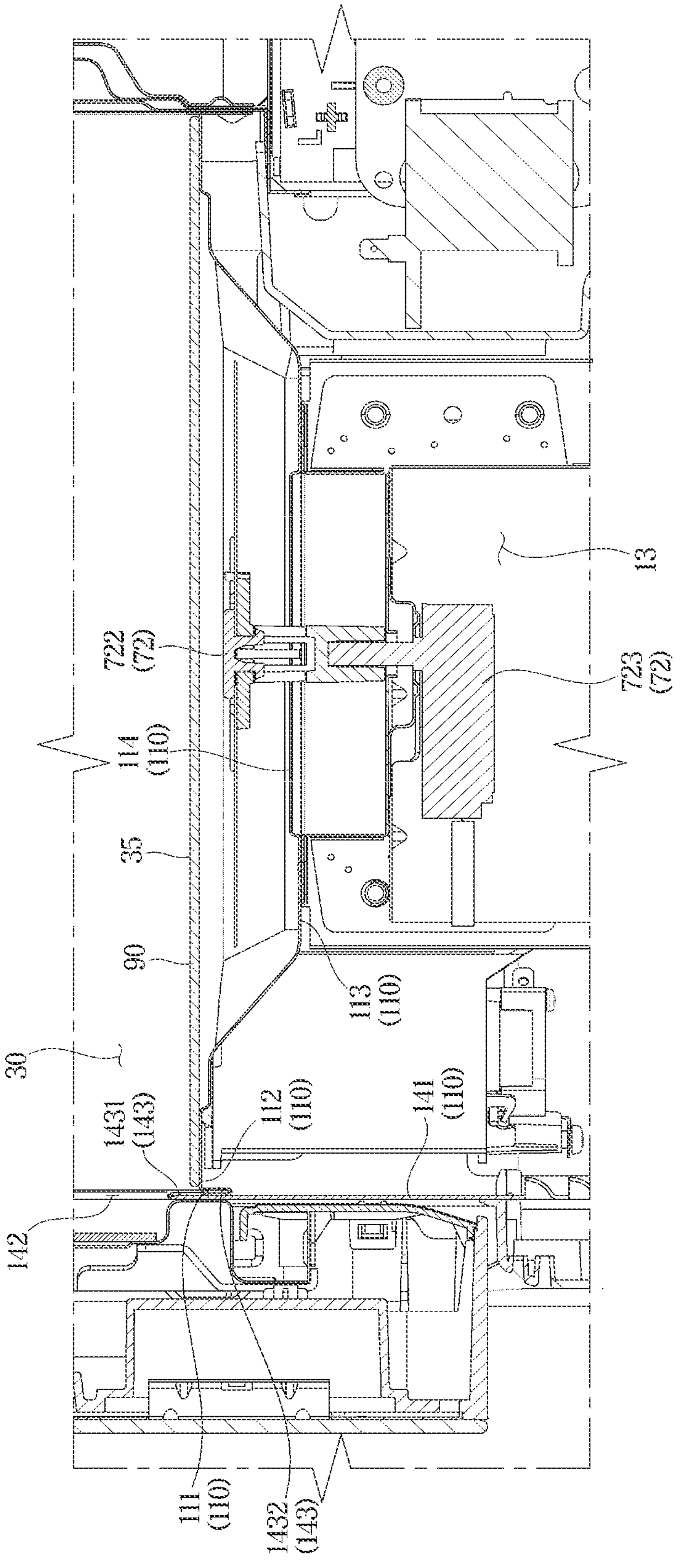
FIG. 15 is a cross-sectional view of a cooking apparatus in X direction, according to an embodiment of the disclosure.

FIG. 15 is a cross-sectional view of a cooking apparatus in X direction, according to an embodiment of the disclosure.

Referring to FIG. 15, the shelf 90 may be installed at the lower surface 112 of the main plate to cover the upper portion of the second heating source 72. For example, the shelf 90 may be arranged at the lower surface 112 of the lower plate 110 to cover the upper portion of the second heating source 72. An object to be cooked may be placed on the upper surface of the shelf 90.

Front sides of the lower plate 110 may be coupled with the front plate 140. For example, the first front coupling flange 143 of the front plate 140 may be arranged to cover the front of the shelf 90. For example, the hemming portion 1431 of the first front coupling flange 143 may be arranged to cover the front of the shelf 90 to prevent the shelf 90 from falling out.

With this structure, the front of the shelf 90 may not be exposed to the user. Furthermore, as the stirrer 722 for stirring high-frequency waves produced by the magnetron 721 is rotationally arranged on the installation surface 113 of the lower plate 110, the shelf 90 may be fixed while forming the bottom surface 35 of the cooking chamber 30. The hemming portion 1431 covers the front of the shelf 90 fixedly arranged as described above so that forward movement of the shelf 90 may be prevented.

Accordingly, in an embodiment of the disclosure, the cooking apparatus 1 may not leak high-frequency waves out of the cooking chamber 30 by coupling by curling between the front plate 140 and the main plate 110, 120, and 130 and having the first front coupling flange 143 on which the first and second curling holes 1433 and 1434 are alternately formed.

Furthermore, as the first front coupling flange 143 of the front plate 140 may be arranged to cover the front of the shelf 90, the shelf 90 may be prevented from being moved.

Moreover, as the front plate 140 and the main plate 110, 120, and 130 are formed of stainless steel, they may be coupled by curling rather than welding. Accordingly, there is no welding section exposed to the user, thereby resulting in better aesthetic impression for the cooking apparatus 1. At the same time, a leak of high-frequency waves may be prevented by arranging the first and second curling holes 1433 and 1434 with optimal dimensions for coupling by curling.

According to the disclosure, the cooking apparatus may include a main plate and a front plate formed of stainless steel and coupled by curling, thereby resulting in better aesthetic impression and having better workability.

As the front plate is arranged to cover the front of a shelf arranged on a lower surface of the main plate, the shelf may be prevented from falling out.

Furthermore, a leak of radio waves that might be caused by a hemming portion formed on the front plate may be minimized by adjusting dimensions and gaps of curling holes.

Example embodiments of the disclosure have been described above, but a person of ordinary skill in the art will understand and appreciate that various modifications can be made without departing from the scope of the disclosure. Thus, it will be apparent to those or ordinary skill in the art that the true scope of technical protection is defined by the following claims.

What is claimed is:

1. A cooking apparatus, comprising: a cooking chamber; a heating source disposed below the cooking chamber to produce electromagnetic waves; a main plate forming at least a portion of the cooking chamber and including a front side which is opened; a front plate coupled to the front side of the main plate and including a base having an opening connected to the cooking chamber; and a front coupling flange, bent rearward from an inner end of the base, coupled by curling with the main plate, and including a portion which protrudes above a lower surface of the main plate, wherein the front coupling flange includes:

- a hemming portion bent at a position above the lower surface of the main plate and aligned with a rear surface of the base, and
- a plate coupling portion bent from the hemming portion and coupled with the main plate, wherein at least a portion of the plate coupling portion is disposed below the lower surface of the main plate.

2. The cooking apparatus of claim 1, further comprising a shelf installed at the lower surface of the main plate to cover an upper portion of the heating source and on which an object to be cooked is placeable, wherein the hemming portion is disposed to cover a front of the shelf to prevent the shelf from falling out.

3. The cooking apparatus of claim 2, wherein the shelf includes a glass material.

4. The cooking apparatus of claim 1, wherein the front coupling flange includes:

a first curling hole having an oval shape, and a second curling hole having a circular shape disposed separately from and adjacent to the first curling hole.

5. The cooking apparatus of claim 4, wherein the first curling hole and the second curling hole are formed in a section in which the hemming portion and the plate coupling portion join.

6. The cooking apparatus of claim 4, wherein a length of a long side of the first curling hole is 20 mm or less.

7. The cooking apparatus of claim 4, wherein a gap between the first curling hole and the second curling hole is 3 mm or more.

8. The cooking apparatus of claim 1, wherein the main plate includes a main coupling flange extending forward from the lower surface and joined by curling with the plate coupling portion.

9. The cooking apparatus of claim 8, wherein the main coupling flange includes:

a first flange portion disposed behind the plate coupling portion, and a second flange portion bent from the first flange portion and inserted into a space between the rear surface of the base and the plate coupling portion.

10. The cooking apparatus of claim 9, wherein the front plate and the main plate are coupled by pressurizing the main coupling flange and the plate coupling portion while the second flange portion is inserted into the space between the rear surface of the base and the plate coupling portion.

11. The cooking apparatus of claim 9, wherein the plate coupling portion includes a guide protrusion which protrudes toward the first flange portion to guide a position of coupling with the main coupling flange.

12. The cooking apparatus of claim 11, wherein the main coupling flange includes a bending hole formed in a section in which the first flange portion and the second flange portion join, and the bending hole receives the guide protrusion.

13. The cooking apparatus of claim 1, wherein the heating source includes:

a magnetron configured to produce the electromagnetic waves, and a rotatable stirrer configured to radiate the electromagnetic waves produced from the magnetron in a plurality of directions.

14. The cooking apparatus of claim 1, wherein the main plate includes:

a side plate disposed behind the front plate and coupled to a side edge of the opening;

a lower plate disposed behind the front plate and coupled to a lower edge of the opening; and an upper plate disposed behind the front plate and coupled to an upper edge of the opening.

* * * * *